United States Patent
Pickett et al.

[11] Patent Number: 6,076,156
[45] Date of Patent: Jun. 13, 2000

[54] INSTRUCTION REDEFINITION USING MODEL SPECIFIC REGISTERS

[75] Inventors: James K. Pickett; David S. Christie, both of Austin, Tex.

[73] Assignee: Advanced Micro Devices, Inc., Sunnyvale, Calif.

[21] Appl. No.: 08/895,800

[22] Filed: Jul. 17, 1997

[51] Int. Cl.[7] .................................................. G06F 9/318
[52] U.S. Cl. ........................... 712/226; 712/229; 712/209
[58] Field of Search .................................... 395/570, 567, 395/568, 385; 712/229, 226, 227, 209, 228

[56] References Cited

U.S. PATENT DOCUMENTS

| | | | |
|---|---|---|---|
| 4,095,278 | 6/1978 | Kihara | 395/567 |
| 4,109,311 | 8/1978 | Blum et al. | 395/567 |
| 4,236,204 | 11/1980 | Groves | 395/567 |
| 4,639,865 | 1/1987 | Martin | 395/567 |
| 4,691,278 | 9/1987 | Iwata | 395/570 |
| 4,783,738 | 11/1988 | Li et al. | 395/800.21 |
| 4,876,639 | 10/1989 | Mensch, Jr. | 395/385 |
| 5,404,554 | 4/1995 | Fuse | 395/567 |
| 5,682,491 | 10/1997 | Pechanek et al. | 395/385 |
| 5,854,912 | 12/1998 | Mahalingaiah | 712/208 |
| 5,854,913 | 12/1998 | Goetz et al. | 712/210 |
| 5,872,919 | 2/1999 | Wakeland | 709/230 |

OTHER PUBLICATIONS

Turley, James L., *Advanced 80386 Programming Techniques*, Osborne McGraw–Hill, 1988.

1996 Pentium Pro Family Developer's Manual, vol. 3: Operating System Writer's Guide, Intel Corporation, pp. 8–7, 10–11, 10–12, 10–14 through 10–18, 16–1 through 16–18, Appendix C—C–1 through C7.

*Primary Examiner*—Richard L. Ellis
*Attorney, Agent, or Firm*—Conley, Rose & Tayon; Robert C. Kowert; Lawrence J. Merkel

[57] ABSTRACT

A microprocessor employs an instruction redefinition register which programmably redefines the operation performed by one or more instructions. Instructions may be added to the instruction set executed by the microprocessor without consuming opcode encodings. One or more new instructions may be mapped to an opcode assigned to a redefinable instruction (e.g. a seldom-used instruction selected during the design of the microprocessor to be redefinable to one or more of the added instructions). A particular application program may select the architecturally defined operation corresponding to the redefinable instruction or one of the operations corresponding to the new operations by coding the instruction redefinition register. In one particular embodiment, the instruction redefinition register is a model specific register (MSR) as defined by the x86 microprocessor architecture. A frequently-used instruction may also be selected as a redefinable instruction for purposes of expanding the microprocessor resources available as operands of that instruction.

21 Claims, 5 Drawing Sheets

INSTRUCTION REDEFINITION USING MODEL SPECIFIC REGISTERS

BACKGROUND OF THE INVENTION

1. Field of the Invention

This invention is related to the field of microprocessors and, more particularly to instruction execution within microprocessors.

2. Description of the Related Art

Generally, a microprocessor is designed to execute instructions from a predefined instruction set. The instruction set is defined as part of a microprocessor architecture to which the microprocessor is implemented. Additionally, the microprocessor architecture defines other features of the microprocessor such as the memory addressing scheme, address translation modes, operand addressing modes, protection modes, etc. For example, the x86 microprocessor architecture is the microprocessor architecture employed by the line of microprocessors including the 8086, 80286, 80386, 80486, etc.

According to the microprocessor architecture employed by a particular microprocessor, the microprocessor performs a predefined operation in response to each instruction within the instruction set, thereby producing a result. The predefined operation is performed upon one or more input operands specified by the instruction. The input operands may be either implicit to the instruction or explicitly encoded in an instruction field. The predefined operation of a particular instruction within the instruction set is referred to herein as the "architecturally defined operation" for that instruction. The architecturally defined operation is the operation associated with a given opcode encoding by the microprocessor architecture.

Instructions within an instruction set are differentiated from one another via the opcodes assigned to each instruction. Each instruction is assigned at least one opcode encoding, and no opcode encoding is assigned to more than one instruction. Unfortunately, once the instruction format is defined within a given microprocessor architecture, it is difficult to increase the number of opcode encodings. As various microprocessor implementations are developed, it is often desirable to add instructions to the instruction set. The added instructions are assigned opcode encodings from the list of previously unassigned opcodes. Once the list of unassigned opcodes is exhausted, then no more instructions can be easily added to the instruction set.

Further compounding the problem is that some of the instructions within the instruction set are seldom used. For example, certain instructions are defined as privileged. Privileged instructions are typically executed only by the operating system. The operating system is the low-level software within a computer system including the microprocessor. The operating system schedules tasks, allocates storage, handles the interface to peripheral hardware and presents a default interface to the user when no application program is running. Exemplary operation systems include Windows, UNIX, etc. Application programs, which are designed to perform a particular task and use the operating system to access peripheral hardware and perform other low-level services, are typically not accorded a privilege level sufficient to execute the privileged instructions. The opcode encodings assigned to the privileged instructions are effectively wasted while application programs are executing. Still further, other instructions are defined to perform an operation which is seldom used. Operations which are seldom used may be detected, for example, by analyzing the percentage of different instructions executed by different application programs. Those instructions with low utilization (less than, for example, 5% of instructions executed) are the instructions which perform seldom-used operations. If an application program does not execute the seldom-used instruction, the opcode encoding assigned to the seldom-used instruction is effectively wasted as well while that application program is running. However, since other applications use the seldom-used instructions and the operating system uses the privileged instructions, these instructions cannot be discarded to free opcode encodings for assignment to newly added instructions.

In addition to adding new operations to a predefined instruction set, other feature expansions may be desirable as well. For example, adding resources (such as more registers to be used as general operands for instructions) may be difficult given the instruction encodings selected when the microprocessor architecture is defined.

SUMMARY OF THE INVENTION

The problems outlined above are in large part solved by a microprocessor in accordance with the present invention. The microprocessor employs an instruction redefinition register which programmably redefines the operation performed by one or more instructions. Advantageously, instructions may be added to the instruction set executed by the microprocessor without consuming opcode encodings. Instruction redefinition may be employed even if all of the opcode encodings which may be defined under the instruction format provided by the microprocessor architecture have been assigned to instructions.

One or more new instructions may be mapped to an opcode assigned to a redefinable instruction (e.g. a seldom-used instruction selected during the design of the microprocessor to be redefinable to one or more of the added instructions). A particular application program may select the architecturally defined operation corresponding to the redefinable instruction or one of the operations corresponding to the new instructions by coding the instruction redefinition register. In one particular embodiment, the instruction redefinition register is a model specific register (MSR) as defined by the x86 microprocessor architecture.

A frequently-used instruction may also be selected as a redefinable instruction for purposes of expanding the microprocessor resources available as operands of that instruction. Advantageously, resources may be added to a microprocessor architecture even if all of the instruction encodings are exhausted.

Broadly speaking, the present invention contemplates an apparatus for redefining an operation performed in response to an instruction, comprising a register and a decode unit. The register is configured to store a field corresponding to the instruction. Coupled to the register to receive the field, the decode unit is configured to produce a first decoded instruction in response to the instruction if the field is encoded in a first state. Still further, the decode unit is configured to produce a second decoded instruction in response to the instruction if the field is encoded in a second state.

The present invention further contemplates a method for redefining an operation performed by a microprocessor in response to an instruction. A field corresponding to the instruction is updated. The field is stored in a model specific register within the microprocessor. The instruction is executed in the microprocessor. The microprocessor performs an architecturally defined operation in response to the instruction if the field is encoded to a first value, and a different operation than the architecturally defined operation if the field is encoded to a second value.

Additionally, the present invention contemplates a microprocessor including a model specific register configured to store a field corresponding to an instruction. The microprocessor is configured to perform an architecturally defined operation in response to the instruction if the field is encoded to a first state. Alternatively, the microprocessor is configured to perform a different operation than the architecturally defined operation in response to the instruction if the field is encoded to a second state.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
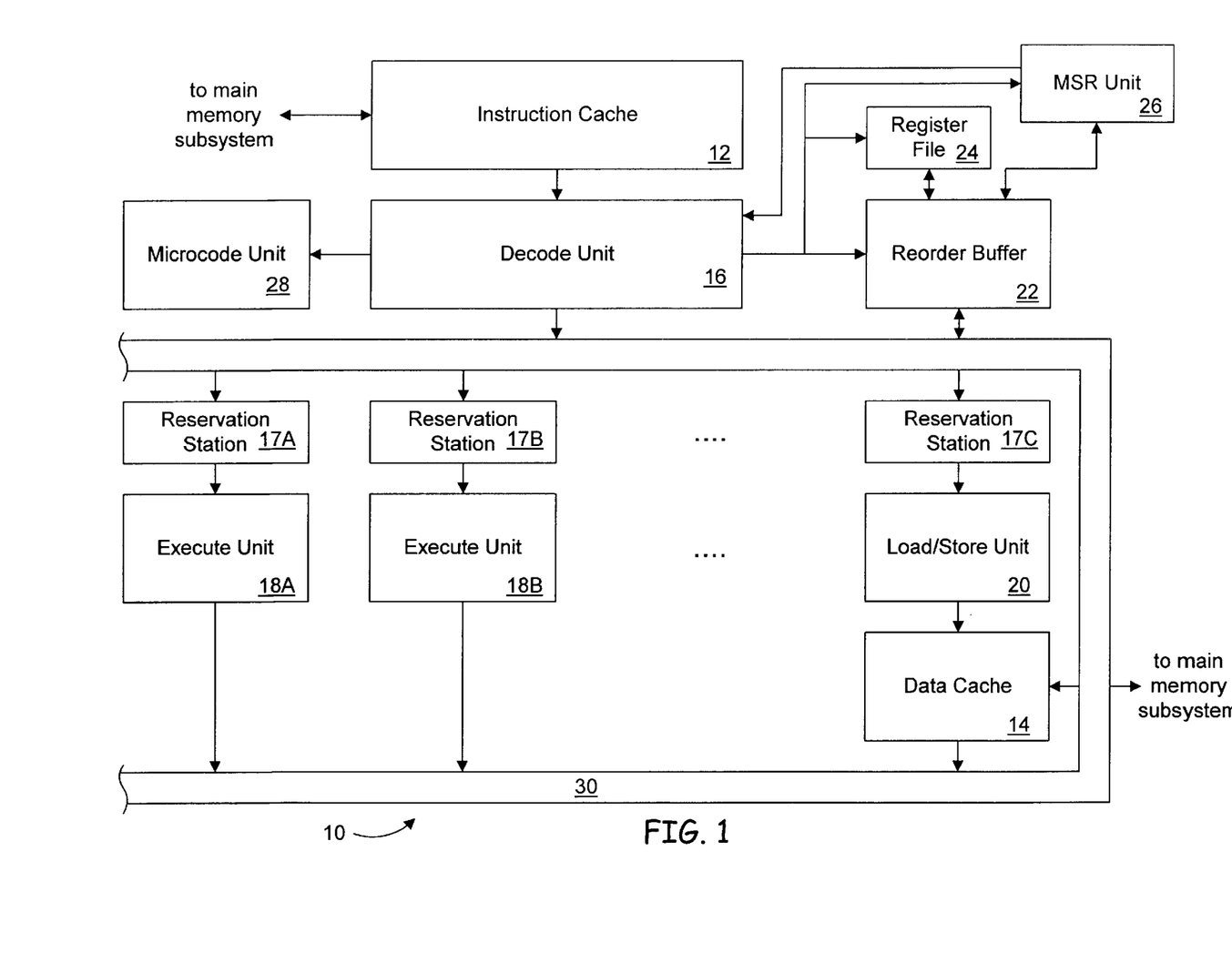
FIG. 1 is a block diagram of one embodiment of a microprocessor.

Turning now to FIG. 1, a block diagram of one embodiment of a microprocessor 10 is shown. Microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a model specific register (MSR) unit 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, reorder buffer 22, register file 24, MSR unit 26, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to the main memory subsystem. Finally, MSR unit 26 and register file 24 are coupled to reorder buffer 22.

Generally speaking, microprocessor 10 is configured to reassign the operation performed by a given instruction when an instruction redefinition mode is enabled. Microprocessor 10 employs a model specific register (MSR) within MSR unit 26 for storing an indication of the instructions which are redefined and the operation which those instructions are redefined to perform. The instructions which are redefinable ("redefinable instructions") may be preselected from the set of seldom-used instructions (e.g. privileged instructions and instructions whose corresponding architecturally defined operation is seldom used). A field within the MSR corresponds to each of the redefinable instructions. Using a write MSR instruction, an application program can redefine an instruction to perform a predetermined operation which is different than the architecturally defined operation for that instruction. Advantageously, new instructions can be added to the instruction set without consuming the undefined opcodes (if any). Furthermore, instructions can be added to an instruction set in which all of the opcodes have been consumed.

As opposed to preselecting the instructions to be redefined, microprocessor 10 may instead allow for storage of the opcodes corresponding to the instructions selected for redefinition. In this manner, the application itself may determine which instructions are redefinable instructions. Alternatively, a bit within the MSR may be assigned to each opcode. The application may thereby determine which instructions are remapped by setting the corresponding bit. Furthermore, preselected groups of instructions may be assigned to a particular bit.

Decode unit 16 is coupled to receive signals from MSR unit 26 which represent the instruction redefinitions. For each instruction which microprocessor 10 allows to be redefined, decode unit 16 produces a first decoded instruction which causes execute units 18 and/or load/store unit 20 to perform the architecturally defined operation assigned to the instruction if the signals indicate that the instruction has not been redefined via an update to the corresponding MSR. Alternatively, decode unit 16 produces a second decoded instruction which causes execute units 18 and/or load/store unit 20 to perform a predefined operation which is different than the architecturally defined operation if the signals indicate that the instruction has been redefined via an update to the corresponding MSR. According to one embodiment, instruction redefinition is enabled via a redefinition enable flag stored in a status flags register. If the redefinition enable flag is not set, then the signals from MSR unit 26 are ignored by decode unit 16 and decode unit 16 produces the first decoded instruction. Alternatively, execute units 18 may be coupled to receive the signals from MSR unit 26 and may change execution of the instruction in response to those signals.

MSR unit 26 comprises a plurality of model specific registers. Generally speaking, model specific registers are used to control features which are part of the implementation of microprocessor 10 but which are not part of the microprocessor architecture employed by microprocessor 10. For example, debug features supported by microprocessor 10 may be controlled by model specific registers. Additionally, performance monitoring features may be controlled via model specific registers. According to the present embodiment of microprocessor 10, a model specific register is assigned to store instruction redefinition controls.

According to one embodiment, microprocessor 10 employs the x86 microprocessor architecture. The x86 microprocessor architecture employs MSRs, with a RDMSR instruction for reading the MSRs and a WRMSR instruction for writing the MSRs. The RDMSR and WRMSR instructions are defined as privileged instructions in the x86 microprocessor architecture. Microprocessor 10, on the other hand, does not treat the RDMSR and WRMSR instructions as privileged if the MSR being updated is the MSR which stores instruction redefinition information. If that MSR is being updated or read, the WRMSR or RDMSR instruction is executed as non-privileged. Otherwise, the instruction is executed as privileged. Although the x86 microprocessor architecture is employed by one embodiment of microprocessor 10, other embodiments may employ different microprocessor architectures.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location). Load/store unit 20 performs the memory transfers, and an execute unit 18 performs the execution of the instruction.

Figure 2:
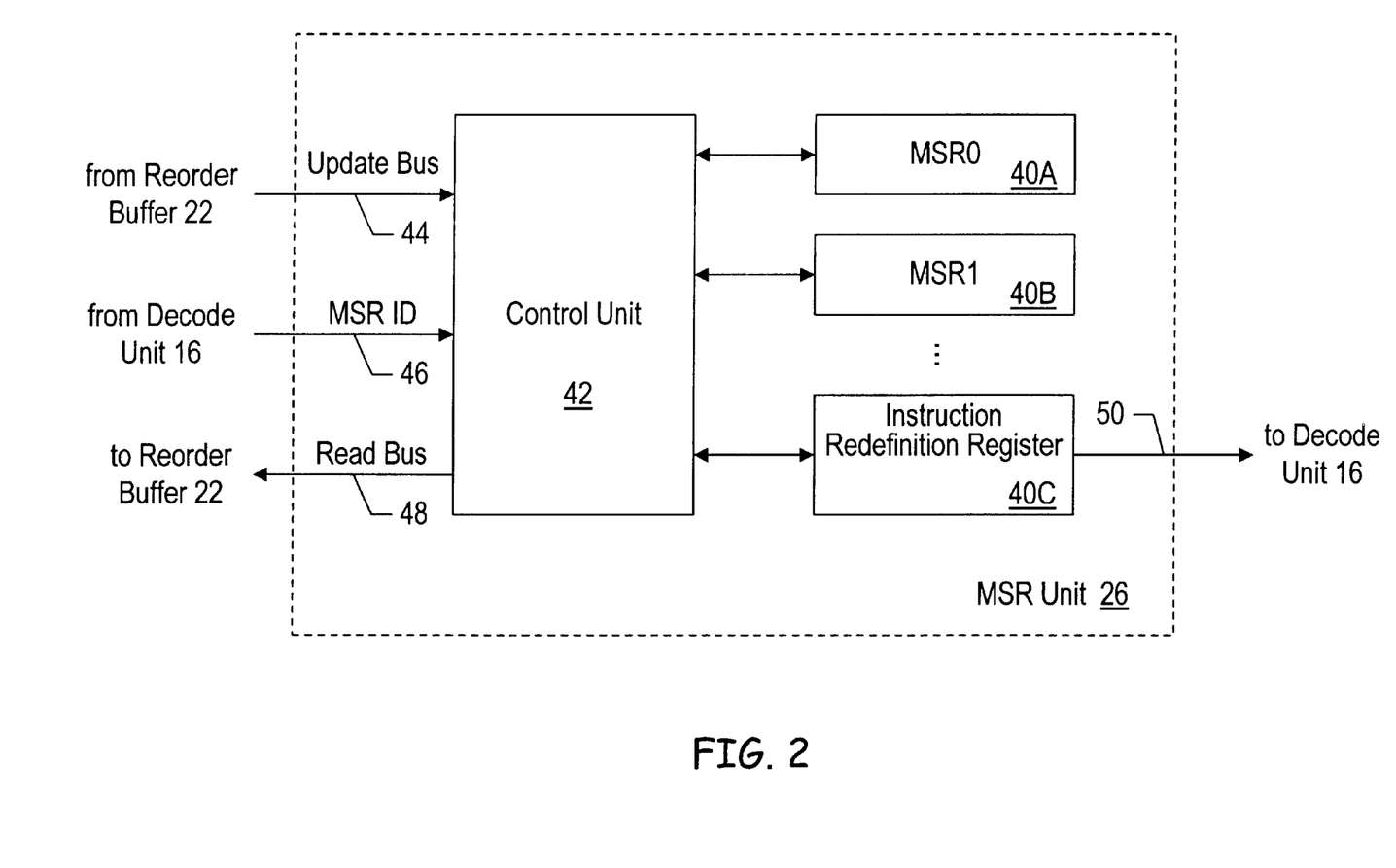
FIG. 2 is a block diagram of one embodiment of a model specific register unit shown in FIG. 1.

Turning next to FIG. 2, a block diagram of MSR unit 26 is shown. MSR unit 26 includes a plurality of MSRs 40A, 40B, etc. One of MSRs 40 is shown as MSR 40C, which is labeled "instruction redefinition register" in FIG. 2. The instruction redefinition register is the MSR assigned to store instruction redefinition information. Although MSR 40C will be referred to herein as instruction redefinition register 40C, it is noted that instruction redefinition register 40C is an MSR. In other words, instruction redefinition register 40C is accessed using the read MSR and write MSR instructions (e.g. RDMSR and WRMSR in embodiments employing the x86 microprocessor architecture). One of the operands of the read MSR and write MSR instructions is a value (the MSR ID) which selects one of MSRs 40 for access. One value of the MSR ID selects MSR 40C.

A control unit 42 is shown in FIG. 2 as well. Control unit 42 is coupled to each of MSRs 40 for accessing and updating (i.e. reading and writing) MSRs 40 in response to read MSR and write MSR instructions. Control unit 42 is coupled to an update bus 44 from reorder buffer 22, an MSR ID bus 46 from decode unit 16, and a read bus 48 to reorder buffer 22.

Update bus 44 is used by reorder buffer 22 to convey an update value for an MSR, as well as an MSR ID identifying the MSR to be updated. Upon retirement of a write MSR instruction, reorder buffer 22 provides the update value generated according to execution of the write MSR instruction and the MSR ID provided as an operand of the write MSR instruction upon update bus 44. Control unit 42 updates the identified MSR 40 with the updated value.

When decode unit 16 decodes a read MSR instruction, decode unit 16 may detect the MSR ID and convey it to control unit 42 upon MSR ID bus 46. Control unit 42 accesses the identified MSR and provides the value stored in the identified MSR upon read bus 48 to reorder buffer 22. This process is similar to decode unit 16 conveying a register number to register file 24 and register file 24 providing the value stored therein to reorder buffer 22. Reorder buffer 22 either provides the value stored in the identified MSR or replaces the value with a tag or value stored in reorder buffer 22 if a dependency is detected therein.

Alternatively, the MSR ID may not be detectable by decode unit 16. For example, the RDMSR and WRMSR instructions defined by the x86 microprocessor architecture define the MSR ID as being stored in the ECX register. For such a case, MSR ID bus 46 may be coupled to execute units 18. Furthermore, read bus 48 may be part of result bus 30 in such a case.

It is noted that the write MSR instruction may be implemented as a serialized instruction (i.e. instructions prior to the write MSR instruction are completed before executing the write MSR instruction, and the write MSR instruction is completed before executing instructions subsequent to the write MSR instruction). If the write MSR instruction is serialized, then dependency checking for the MSR being read by the read MSR instruction may not be needed.

A write MSR instruction selecting instruction redefinition register 40C is used to enable instruction redefinition mode in microprocessor 10. The value stored into instruction redefinition register 40C determines which instructions are redefined, and which non-architecturally defined operations are to be performed in response to the redefined instructions. The read MSR instruction may be used to examine the contents of instruction redefinition register 40C and thereby determine which of the added instructions (corresponding to the non-architecturally defined operations) have been activated.

According to one embodiment, a redefinition enable flag is stored in the status flags register employed by microprocessor 10. The redefinition enable flag is enabled to enable the use of the added instructions via instruction redefinition mode. The redefinition enable flag may be implicitly enabled by microprocessor 10 when a write MSR instruction is performed to instruction redefinition register 40C and at least one of the redefinable instructions is selected to be redefined. Similarly, the redefinition enable flag may be implicitly disabled when a write MSR instruction is executed which defines all redefinable instructions to perform their architecturally defined operations. Alternatively, application programs may be required to contain an explicit enable and disable of the redefinition enable flag.

A bus 50 is coupled between instruction redefinition register 40C and decode unit 16. Bus 50 conveys the values stored in instruction redefinition register 40C to decode unit 16. In this manner, decode unit 16 may determine which decoded instruction to produce upon decode of a redefinable instruction.

Figure 3:
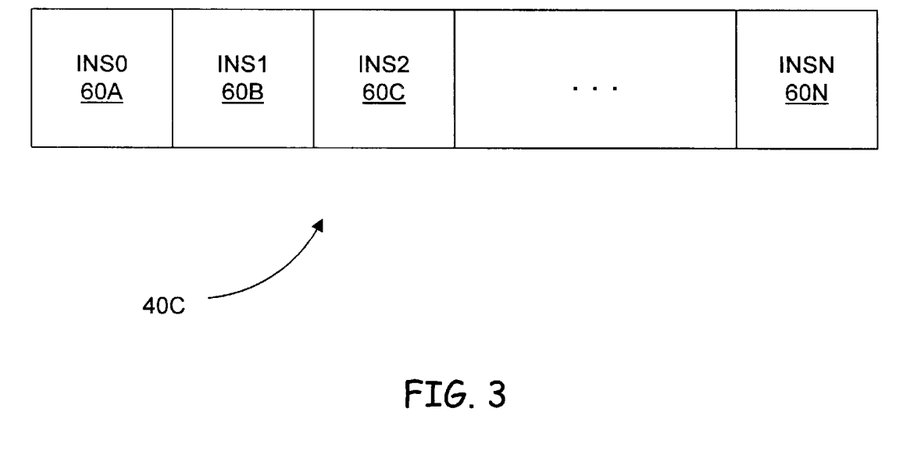
FIG. 3 is a diagram illustrating fields within one embodiment of an instruction redefinition register shown in FIG. 2.

Turning next to FIG. 3, a diagram illustrating the contents of one embodiment of instruction redefinition register 40C is shown. As illustrated in FIG. 3, instruction redefinition register 40C stores multiple fields 60A, 60B, 60C, etc., through 60N. A different field 60A–60N corresponds to each of the redefinable instructions. The field 60A–60N corresponding to a particular redefinable instruction stores the operation selected by the application for performance in response to that particular redefinable instruction. One of the encodings of the field 60A–60N selects the architecturally defined operation assigned to the redefinable instruction. Other encodings of the field 60A–60N select other operations which may be assigned to the redefinable instruction according to the design of decode unit 16 and execute units 18.

In one embodiment, each field 60A–60N is a bit. For this embodiment, each redefinable instruction may be defined to perform its architecturally defined operation or one other predefined operation. For example, when the bit is clear, the architecturally defined operation may be selected while, when the bit is set, the other predefined operation may be selected.

In another embodiment, each field 60A–60N is a multiple bit value. One encoding of the multiple bits (e.g. each bit being clear) selects the architecturally defined operation assigned to the corresponding instruction. Other encodings select different operations which the instruction may be redefined to perform. For this embodiment, multiple added instructions may be mapped to the same redefinable instruction. While the multiple additional instructions may not simultaneously be used, more instructions may be added given a constant number of redefinable instructions. Decode unit 16 produces a different decoded instruction for each encoding of the multiple bits in response to decoding the corresponding redefinable instruction.

In yet another embodiment, some fields 60A–60N may be a single bit while other fields 60A–60N may be multiple bits. Any combination of field sizes may be employed according to various embodiments of microprocessor 10. Generally speaking, a "field" comprises at least one bit. The bits included in the field are assigned a specific interpretation as a whole. For example, fields 60A–60N are interpreted as specifying the operation to be performed in response to the corresponding instruction.

In still another embodiment, each field 60A–60N may store opcode information identifying the instruction represented by that field as well as a value indicating the nature of the redefinition. Such an embodiment may provide enhanced flexibility by allowing an application program to select the redefinable instructions instead of preselecting the redefinable instructions during the design of microprocessor 10. For example, embodiments of microprocessor 10 employing the x86 microprocessor architecture may store up to fourteen bits of opcode information and a mask field indicating which of the bits of opcode information are to be considered by decode unit 16 to determine if a particular instruction is redefined by the field 60A–60N. Alternatively, decode unit 16 may be configured to detect which of the bits of opcode information to consider given the opcode byte encoding (which comprises eight of the fourteen bits), thereby eliminating the mask field for such embodiments. The mask field allows for certain of the available opcode information bits to be don't cares for the particular redefinition. For example, it may be desirable for the opcode extension and mod field bits to be don't cares.

According to one particular embodiment, the bits of opcode information included within a field 60A–60N include: eight bits comprising the opcode byte, a bit indicating whether or not a "0F" prefix byte is included, three bits of opcode extension from the first register field of the addressing mode (MOD R/M) byte, and two bits from the "mod" field of the MOD R/M byte. It is noted that, while fourteen bits are used as an example of opcode information which may be stored by embodiments of microprocessor 10 employing the x86 microprocessor architecture, different embodiments may employ more or different bits and may store similar or different opcode information.

An example of using instruction bits other than the opcode byte to identify a redefinable instruction is the use of illegal instruction encodings as the redefinable instruction. Since the instruction encodings are illegal, they may be redefined without loss of any original functionality. For example, the LDS, LES, etc. instructions of the x86 microprocessor architecture require a memory operand. Therefore, encodings of the MOD R/M byte which indicate the operand is a register operand are illegal encodings. These encodings may be specified as redefinable instructions.

Figure 4:
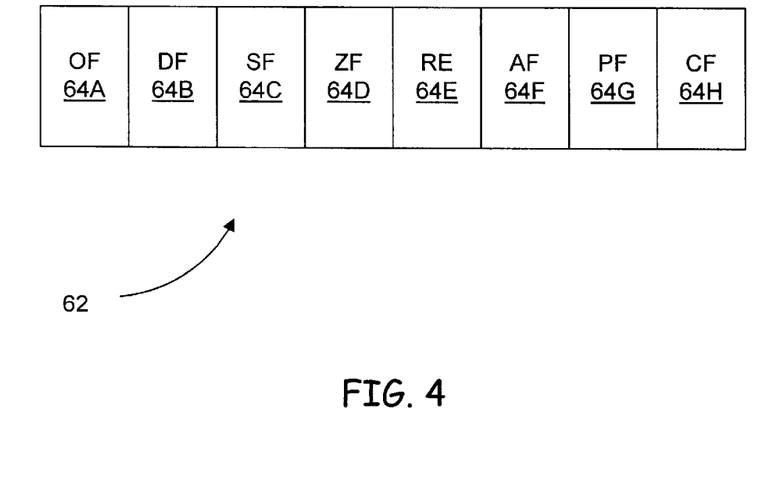
FIG. 4 is a diagram illustrating one embodiment of a status flags register.

Turning now to FIG. 4, diagram illustrating the contents of a status flags register 62 is shown. Status flags register 62 as illustrated in FIG. 4 is compatible with the x86 microprocessor architecture. Other embodiments of status register 62 may be employed to be compatible with other microprocessor architectures. As shown in FIG. 4, status flags register 62 includes status flags 64A–64H.

Generally speaking, a status flags register is used to store an indication of certain events which may occur during the execution of instructions. The status flags may be tested by conditional branch instructions, for example, to determine if the conditional branch instruction should be taken or not taken. Still further, status flags may be used as input operands to instructions. For example, the carry flag may be used as an input operand to an addition instruction. As another example, DF flag 64B indicates whether string type instructions should increment their addressing register operand or decrement their addressing register operand.

RE flag 64E is the redefinition enable flag referred to above. Since status register 62 is automatically saved during context switches, the information concerning whether or not instruction redefinition is enabled within a particular context is automatically saved via RE flag 64E. Advantageously, the instruction redefinition mode is restored upon return to the particular context. Additionally, the state of RE flag 64E upon initiating a context switch may be used as a signal to store the contents of instruction redefinition register 40C in a predetermined location for restoration upon return to the particular context. Upon return to the particular context, the state of RE flag 64E as restored into status register 62 can similarly be used as a signal to reload the instruction redefinition register 40C from the predetermined location. Microcode unit 28 may be employed to perform context switches, and may therefore be programmed to detect the setting of RE flag 64E and perform additional save and restore operations accordingly. Therefore, the addition of RE flag 64E and the added instructions enabled thereby are transparent to operating system software. Only the application program using the added instructions and microprocessor 10 need be aware of the added instructions.

Decode unit 16 is coupled to receive RE flag 64E in addition to the contents of instruction redefinition register 40C. If RE flag 64E indicates that instruction redefinition is disabled, decode unit 16 ignores the values stored in instruction redefinition register 40C and produces a decoded instruction for each redefinable instruction which causes the corresponding architecturally defined operation to occur. If RE flag 64E indicates that instruction redefinition is enabled, decode unit 16 produces either a first decoded instruction causing the architecturally defined operation to occur or a second decoded instruction causing a different operation to occur in response to decoding a redefinable instruction (depending upon the corresponding field 60A–60N of instruction redefinition register 40C).

OF flag 64A is the overflow flag defined by the x86 microprocessor architecture. Similarly, DF flag 64B is the direction flag, SF flag 64C is the sign flag, ZF flag 64D is the zero flag, AF flag 64F is the auxiliary carry flag, PF flag 64G is the parity flag, and CF flag 64H is the carry flag as defined by the x86 microprocessor architecture. It is noted that the status flags register in the x86 microprocessor architecture is referred to as the EFLAGS register. The EFLAGS register may additionally store system flags (not shown). It is noted that status flags register 62 may be located anywhere within microprocessor 10. A suitable location may, for example, be reorder buffer 22.

Figure 5:
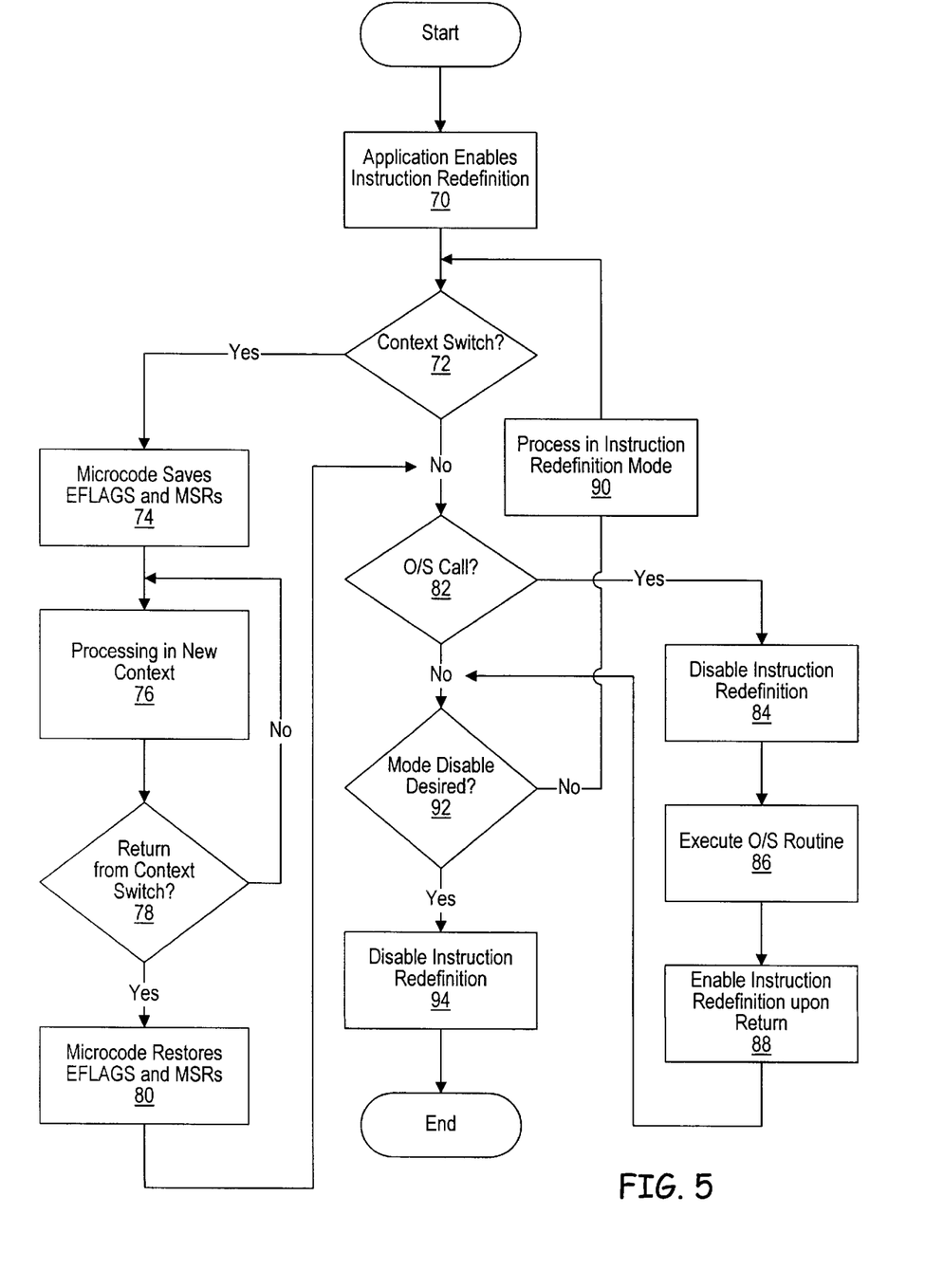
FIG. 5 is a flow chart illustrating usage of the instruction redefinition mechanism.

Turning now to FIG. 5, a flowchart is shown illustrating usage of the instruction redefinition mechanism as described above. The usage as shown in FIG. 5 illustrates a combined hardware and application program operation, wherein the application program uses the added instructions made possible through instruction redefinition. The instruction redefinition mechanism becomes activated (step 70) when an application program enables instruction redefinition. Step 70 includes updating instruction redefinition register 40C, and may include updating status register 62 to place RE flag 64E in an enabled state if the update is not implicit. Upon completion of step 70, microprocessor 10 begins executing the redefinable instructions as indicated by the value stored in instruction redefinition register 40C.

If microprocessor 10 experiences a context switch (decision block 72), microcode unit 28 is activated to save the context of the application (step 74). Since the status register is part of the context, the status register is saved into the context storage location identified by the microprocessor architecture employed by microprocessor 10. Additionally, microcode unit 28 examines that status of RE flag 64E. If instruction redefinition is enabled, microcode unit 28 stores the contents of instruction redefinition register 40C into a predefined storage location. The predefined storage location may be a memory location assigned to the application, for example. Alternatively, the application may dedicate registers within register file 24 to store the contents of instruction redefinition register 40C. The contents of instruction redefinition register 40C are thereby automatically saved upon a context switch. Additionally, microcode unit 28 sets the value in instruction register 40C to a default value which maps each redefinable instruction to its architecturally defined operation.

Processing in the new context may subsequently be performed (step 76), until a return to the application program's context is desired (decision block 78). Processing in the new context is performed with instruction redefinition disabled, unless specifically enabled within the new context. Upon return to the application program, microprocessor 28 restores the application program's context (step 80). Restoring the application program's context includes the value in status flags register 62. Additionally, microcode unit 28 examines RE flag 64E upon restoring status flags register 62.

If RE flag 64E indicates that instruction redefinition is enabled, then the contents of instruction redefinition register 40C are restored from either the predefined storage location or the dedicated registers, depending upon the embodiment.

An additional consideration in the use of instruction redefinition by the application program is the use of operating system routines by the application program. It is desirable to allow instruction redefinition to be utilized by the application program, but to disable instruction redefinition when the operation system executes. In this manner, microprocessor 10 may employ instruction redefinition without requiring the operating system to be rewritten. Particularly, if privileged instructions are selected as redefinable instructions, the operating system may need to execute the privileged instruction within the called operating system routine.

Disabling instruction redefinition mode upon context switches effects the disablement of instruction redefinition mode when the operating system begins executing via a context switch. However, application programs often call operating system service routines. These calls may not be performed via a context switch. One method for handling calls to operating system routines is illustrated in FIG. 5. If an operating system call is desired (decision block 82), then the application program disables instruction redefinition mode (step 84). RE flag 64E is set to a disabled state. Subsequently, the application program calls the desired operating system routine (step 86). Upon return from the operating system routine, the application re-enables instruction redefinition mode (step 88). In other words, the application program sets RE flag 64E to an enabled state.

The application program is processed by microprocessor 10 in instruction redefinition mode (step 90) until the application program determines that instruction redefinition mode is no longer desired (decision block 92). Upon determining that instruction redefinition mode is no longer desired, the application program disables instruction redefinition mode (step 94).

Figure 6:
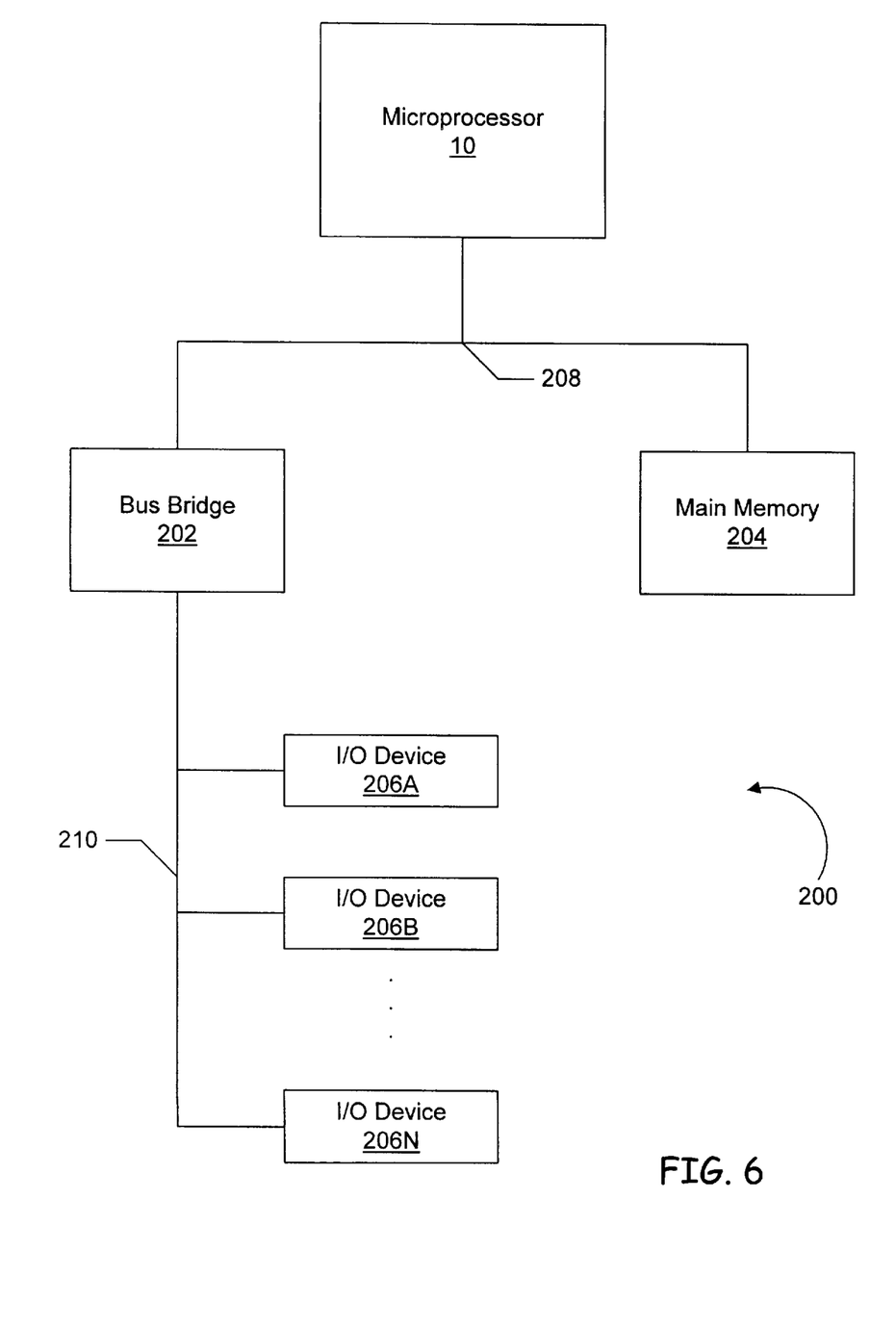
FIG. 6 is a block diagram of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

In accordance with the above disclosure, a microprocessor has been described which allows the operation performed in response to certain instructions to be redefined. Advantageously, new instructions can be added to the instruction set executed by the microprocessor without consuming previously undefined opcodes. More instructions may be executable by the microprocessor than the number of opcodes would otherwise allow.

Numerous variations and modifications will become apparent to those skilled in the art once the above disclosure is fully appreciated. It is intended that the following claims be interpreted to embrace all such variations and modifications.

What is claimed is:

1. An apparatus for redefining an operation performed in response to an instruction, comprising:
   a register configured to store a field for a particular instruction; and
   a decode unit coupled to said register to receive said field, wherein said decode unit is configured to produce a first decoded instruction in response to said particular instruction if said field is encoded in a first state, and wherein said decode unit is configured to produce a second decoded instruction in response to said particular instruction if said field is encoded in a second state.

2. The apparatus as recited in claim 1 wherein said field is a bit.

3. The apparatus as recited in claim 2 wherein said first state comprises said bit being set and said second state comprises said bit being clear.

4. The apparatus as recited in claim 1 wherein said field comprises multiple bits.

5. The apparatus as recited in claim 4 wherein said decode unit is configured to produce a different decoded instruction in response to each different encoding of said multiple bits.

6. The apparatus as recited in claim 1 wherein said register comprises a model specific register.

7. The apparatus as recited in claim 6 further comprising a control unit coupled to said model specific register, wherein said control unit is configured to update said model specific register in response to a write model specific register instruction.

8. The apparatus as recited in claim 1 wherein said register is further configured to store a plurality of fields including said field, and wherein each one of said plurality of fields corresponds to a different instruction.

9. The apparatus as recited in claim 1 further comprising a status flags register, wherein said status flags register is configured to store a redefinition enable flag.

10. The apparatus as recited in claim 9 wherein said first decoded instruction results in an execution of an architecturally defined operation corresponding to said particular instruction.

11. The apparatus as recited in claim 10 wherein said decode unit inhibits production of said second decoded instruction if said redefinition enable flag is disabled.

12. The apparatus as recited in claim 1 wherein said field comprises at least a portion of an opcode identifying said instruction to which said field corresponds.

13. A method for redefining an operation performed by a microprocessor in response to an instruction, comprising:
   updating a field corresponding to a particular instruction, wherein said field is stored in a model specific register within said microprocessor; and
   executing said particular instruction in said microprocessor, wherein said microprocessor performs an architecturally defined operation in response to said particular instruction if said field is encoded to a first value, and wherein said microprocessor performs a different operation than said architecturally defined operation in response to said particular instruction if said field is encoded to a second value.

14. The method as recited in claim 13 further comprising updating a redefinition enable flag within a status flag register within said microprocessor.

15. The method as recited in claim 14 further comprising inhibiting performance of said different operation if said redefinition enable flag is disabled.

16. The method as recited in claim 13 further comprising disabling performance of said different operation upon a context switch by said microprocessor.

17. The method as recited in claim 16 further comprising re-enabling performance of said different operation upon a return from said context switch.

18. The method as recited in claim 13 further comprising disabling performance of said different operation upon an operation system call within said microprocessor.

19. The method as recited in claim 18 further comprising re-enabling performance of said different operation upon a return from said operating system call.

20. A microprocessor comprising:
   a model specific register configured to store a field for a particular instruction, and
   an execution unit configured to perform an architecturally defined operation in response to said particular instruction if said field is encoded to a first state, and wherein said microprocessor is configured to perform a different operation than said architecturally defined operation in response to said particular instruction if said field is encoded to a second state.

21. The microprocessor as recited in claim 20 wherein said model specific register is further configured to store multiple fields including said field, and wherein each one of said multiple fields corresponds to a different instruction.

* * * * *